(12) United States Patent
Kaneko

(10) Patent No.: US 8,872,461 B2
(45) Date of Patent: Oct. 28, 2014

(54) IMPROPER WIRING DETECTING SYSTEM OF PARALLEL INVERTER SYSTEM

(71) Applicant: Fuji Electric Co., Ltd., Kawasaki (JP)

(72) Inventor: Takayuki Kaneko, Kodaira (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 97 days.

(21) Appl. No.: 13/677,281

(22) Filed: Nov. 14, 2012

(65) Prior Publication Data

US 2013/0134917 A1    May 30, 2013

(30) Foreign Application Priority Data

Nov. 29, 2011    (JP) ................. 2011-259777

(51) Int. Cl.
*G01R 31/02*  (2006.01)
*G01R 31/34*  (2006.01)
*H02M 7/493*  (2007.01)
*H02P 1/02*  (2006.01)

(52) U.S. Cl.
CPC ............... *H02M 7/493* (2013.01); *H02P 1/022* (2013.01)
USPC ......................................... 318/490; 318/478

(58) Field of Classification Search
CPC ............ H02H 3/16; H02J 3/005; H02M 1/32; H02M 7/53871
USPC .......... 318/490, 504, 478, 479, 459, 442, 558
See application file for complete search history.

(56) References Cited

U.S. PATENT DOCUMENTS

| 4,063,143 | A | * | 12/1977 | Forstbauer | ...................... 363/40 |
| 5,016,158 | A | * | 5/1991 | Matsui et al. | ................... 363/71 |
| 5,193,054 | A | * | 3/1993 | Galloway et al. | ............... 363/72 |
| 5,198,971 | A | * | 3/1993 | Recker et al. | ................... 363/71 |
| 5,499,186 | A | * | 3/1996 | Carosa | .......................... 363/132 |
| 8,013,553 | B2 | * | 9/2011 | Taniguchi | ................ 318/400.41 |

FOREIGN PATENT DOCUMENTS

| JP | 03-159596 A | 7/1991 |
| JP | 07-020190 A | 1/1995 |
| JP | 2797882 B | 7/1998 |
| JP | 2010-213557 A | 9/2010 |

* cited by examiner

*Primary Examiner* — Bentsu Ro
(74) *Attorney, Agent, or Firm* — Rabin & Berdo, P.C.

(57) ABSTRACT

An improper wiring detecting system of a parallel inverter system can include two polyphase inverters connected in parallel, and voltage detectors to detect an output voltage of each of the phases of each of the inverters. Control units can control turning-on and -off of semiconductor switching devices of the inverters, and a wiring condition deciding means can operate at least one control unit to turn-on specified switching devices in at least one inverter to form a closed circuit between arbitrary two phases of the at least one inverter. The system can carry out comparisons among values of output voltages of the two inverters corresponding to respective phases and detected by the voltage detectors, and make a decision as to whether wiring is correct or not on the basis of the results of the comparisons.

20 Claims, 5 Drawing Sheets

| | |
|---|---|
| 1 : MOTOR | 2a, 2b : INVERTERS |
| 3 : ROTATED POSITION DETECTOR | 4a, 4b : ELECTRIC POWER CONVERTERS |
| 5a, 5b : CONTROL UNITS | 6a, 6b : VOLTAGE DETECTORS |
| 7a, 7b : CURRENT DETECTORS | 8a, 8b : TERMINAL BLOCKS |
| 9a, 9b : TRANSMITTING MEANS | 10a, 10b : OPERATION READOUTS |
| $Q_{1a} \sim Q_{6b}$ : SEMICONDUCTOR SWITCHING DEVICES | $C_{1a} \sim C_{2b}$ : CAPACITORS |

IMPROPER WIRING DETECTING SYSTEM OF PARALLEL INVERTER SYSTEM

CROSS-REFERENCE TO RELATED APPLICATION

This application claims priority under 35 U.S.C. §119 from Japanese Patent Application No. 2011-259777, filed on Nov. 29, 2011, the entirety of which is incorporated herein by reference.

BACKGROUND OF THE INVENTION

1. Field of the Invention

The present invention relates to a technique of detecting improper wiring in a parallel inverter system that drives a load such as a motor with a plurality of inverters connected in parallel.

2. Background Art

Cables for supplying electric power from an inverter to a motor are connected to the inverter and the motor through a connection unit such as a terminal block. This, in the work of laying the cables, sometimes causes improper cable connection to the terminal block, improper cable connection to the motor with an incorrect phase sequence or an erroneous omission of cable connection (hereinafter generically referred to as improper wiring). The driving of a motor without correcting such improper wiring results in an excessive current flowing in the motor, for example, to cause breakdowns of devices or a failure of the system. Hence, an operator must carry out checking beforehand so that there is no such improper wiring.

Here, as a system of related art detecting an unfinished connection between an inverter and a motor as a kind of improper wiring, the system shown in FIG. 4 and FIG. 5 is known, for example.

The system of the related art is that described in JP-A-7-20190 (paragraphs [0007] and [0008] and FIG. 1 and FIG. 2 etc.). FIG. 4 is a circuit diagram showing a motor driving system by an inverter in the related art. The motor driving system shown in FIG. 4 includes a rectifier circuit 101 converting a three-phase AC voltage to a DC voltage, a smoothing capacitor 102, an inverter section 103 including semiconductor switching devices $Q_1$ to $Q_6$, an AC motor M to which a three-phase AC voltage is supplied from the inverter section 103, current sensors 104 detecting their respective output currents in at least two phases of the inverter section 103, a current detector 105, a CPU (Central Processing Unit) 106 carrying out an operation of an output voltage instruction on the basis of the values of the detected currents to output the output voltage instruction, and a base driving circuit 107 producing driving signals for the switching devices $Q_1$ to $Q_6$ according to the output voltage instruction to output the driving signals.

FIG. 5 is a flow chart showing the operation of detecting a state of an unfinished connection between the inverter and the motor M in the motor driving system in the related art shown in FIG. 4.

First, by operating the rectifier circuit 101, the smoothing capacitor 102 is charged to bring the voltage across the smoothing capacitor 102 as the main circuit voltage of the inverter to the specified voltage (S101). In the next, by turning-on a switching device in each of two phases of the three phases in the inverter section 103, a closed circuit ranging from the DC circuit of the inverter to the motor M is formed. For example, by turning-on the switching devices $Q_1$ and $Q_4$, a closed circuit is formed for ascertaining whether or not a current flows from the U-phase to the V-phase in the inverter section 103 or, by turning-on the switching devices $Q_3$ and $Q_2$, a closed circuit is formed for ascertaining whether or not a current flows from the V-phase to the U-phase in the inverter section 103 (S102).

Similar operations are carried out with respect to all of the combinations of the two rest phases (S103 and S104). When it is ascertained that currents flow with respect to all of the combinations of two phases, a decision is made that the motor is normally connected to the output side of each of the phases of the inverter and the processing is made completed ("Yes" at S105). Moreover, when it is ascertained that no current flows with respect to any one of the combinations of two phases, a decision is made that the connection at the connection point in the corresponding phase is unfinished ("No" at S105, and S106).

Furthermore, in Japanese Patent No. 2,797,882 (paragraphs [0018] to [0021] and FIG. 1 and FIG. 2 etc.), a control system of a servomotor is described which the system detects a current at turning-on of switching devices in two-phases of an inverter to make a decision as to whether the servomotor is connected to the inverter or not.

In addition, in JP-A-2010-213557 (paragraphs [0007] to [0012] and FIG. 1 and FIG. 2 etc.), a control system of a three-phase synchronous motor is described. In the control system, output currents in at least two phases of an inverter driving the three-phase synchronous motor are detected to be subjected to orthogonal biaxial transformation, by which a q-axis current feedback signal, a fed back speed signal and a q-axis current instruction are obtained so that the improper wiring in two phases or in three phases of the motor is detected on the basis of thus obtained signals and instruction.

Patent Document 1: JP-A-7-20190 (paragraphs [0007] and [0008] and FIG. 1 and FIG. 2 etc.)

Patent Document 2: Japanese Patent No. 2,797,882 (paragraphs [0018] to [0021] and FIG. 1 and FIG. 2 etc.)

Patent Document 3: JP-A-2010-213557 (paragraphs [0007] to [0012] and FIG. 1 and FIG. 2 etc.)

Any of the systems of related art described in JP-A-7-20190, Japanese Patent No. 2,797,882 and JP-A-2010-213557 is a system for the case of driving a motor with a single inverter.

Compared with this, in a parallel inverter system driving a single motor with a plurality of inverters connected in parallel, cables are present by the number of the inverters connected in parallel even in the same phase. Thus, there is a problem in that it is unknown which inverter has improper wiring to the motor. In particular, in a parallel inverter system, when inductance components among inverters are small, the inverters brought into operation with improper wiring being included therein may cause a short circuit by some way of energization to result in an excessive current flowing in switching devices in the inverters, which might damage the system.

In addition, there is also a problem in that although in the system described in Japanese Patent No. 2,797,882, detection of an incorrect phase sequence in the wiring connected to the motor is possible (paragraph [0030] etc.), in each of the systems described in JP-A-7-20190 and JP-A-2010-213557, detection of an incorrect phase sequence is impossible.

Accordingly, it is an object of the invention to provide an improper wiring detecting system which is capable of surely detecting improper wiring such as an unfinished connection to a terminal block and incorrect connection in a parallel inverter system including a plurality of inverters. Moreover, it is another object of the invention to provide an improper wiring detecting system which makes detection of incorrect phase sequences possible as required.

SUMMARY OF THE INVENTION

For solving the problem, a first aspect of the invention is an improper wiring detecting system of a parallel inverter system formed of a plurality of inverters connected in parallel, each outputting polyphase AC electric power of variable voltage, with the output sides of the respective inverters connected to a single load, the improper wiring detecting system including:

a voltage detecting means for detecting an output voltage of each of the phases of each of the inverters;

a controlling means for controlling turning-on and -off of semiconductor devices forming each of the inverters; and a wiring condition deciding means for operating the controlling means to turn-on specified switching devices in one inverter to form a closed circuit between arbitrary two phases of the one inverter, carrying out comparisons among values of output voltages of a plurality of the inverters including the one inverter, each of the output voltages being an output voltage of each of the phases of each inverter and being detected by the voltage detecting means, and making a decision as to whether wiring is correct or not on the basis of the results of the comparisons.

A second aspect of the invention is that, in the improper wiring detecting system of a parallel inverter system according to the first aspect of the invention, a means of mutually transmitting the values of the output voltages detected by the voltage detecting means among a plurality of the inverters and sharing the values is provided in each of a plurality of the inverters.

A third aspect of the invention is that, in the improper wiring detecting system of a parallel inverter system according to the first or second aspect of the invention, a phase sequence deciding means is further included for starting a polyphase AC motor as the load, connected to the inverter with wiring decided to be normal by the wiring condition deciding means, without the use of information of a rotated position to make a comparison between the direction of rotation based on a speed instruction value of the motor and the direction of actual rotation for making a decision as to whether the phase sequence of the motor is correct or not.

A fourth aspect of the invention is that, in the improper wiring detecting system of a parallel inverter system according to any one of the first to third aspects of the invention, a plurality of the inverters are allowed to carry out normal operations only at the completion of the decision processing by the wiring condition deciding means or the phase sequence deciding means.

A fifth aspect of the invention is that, in the improper wiring detecting system of a parallel inverter system according to any one of the first to fifth aspects of the invention, the wiring condition deciding means or the phase sequence deciding means is actualized by a processing unit in the controlling means.

According to the invention, in a parallel inverter system in which a plurality of inverters are connected in parallel, improper wiring including an unfinished connection, an incorrect connection to a terminal block and further an incorrect phase sequence can be surely and easily detected.

DETAILED DESCRIPTION

In the following, an embodiment of the invention will be explained with reference to the attached drawings.

Figure 1:
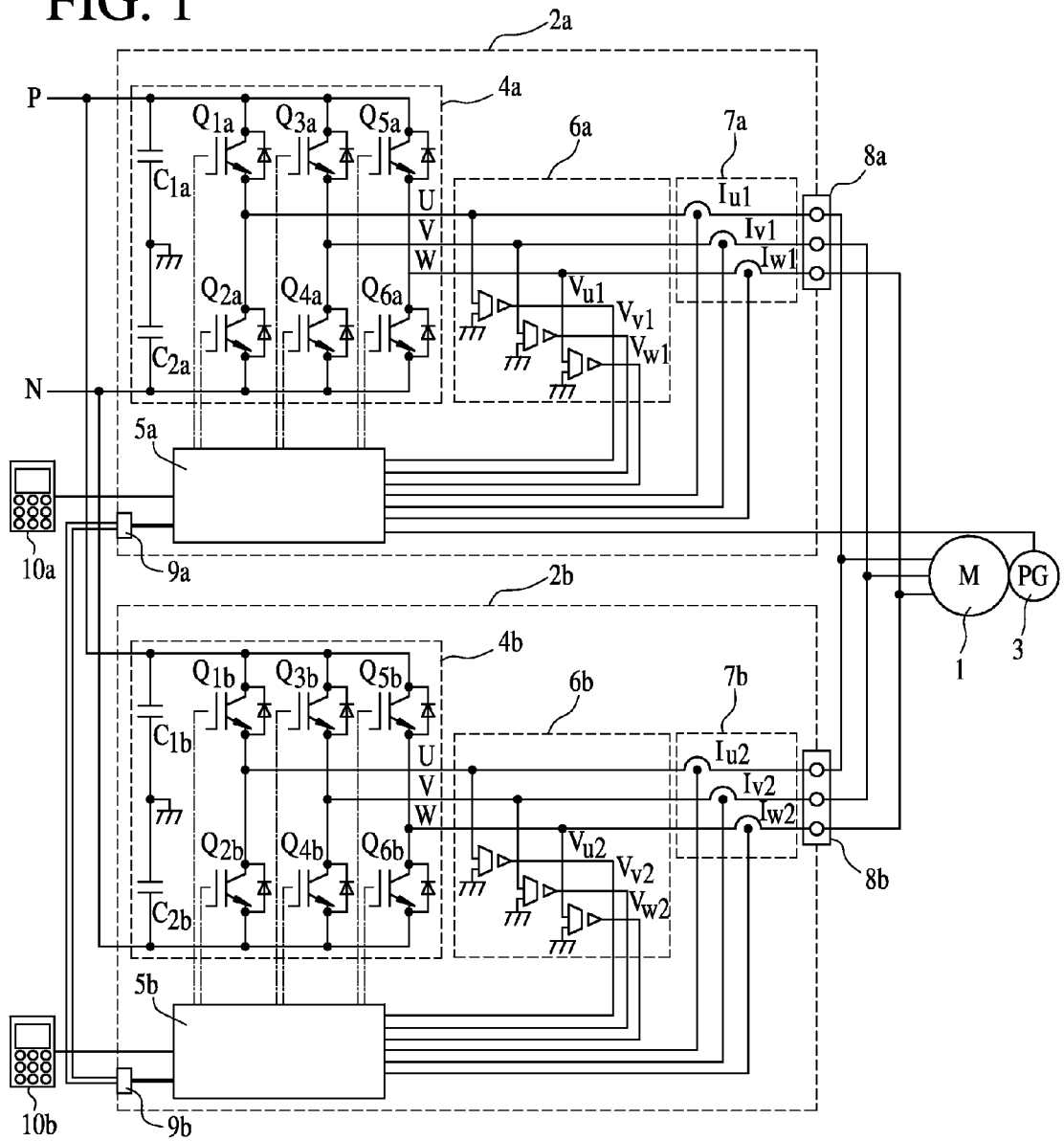
FIG. 1 is a circuit diagram showing a circuit configuration of a parallel inverter system as an embodiment according to the invention.

First, FIG. 1 is a circuit diagram showing a circuit configuration of a parallel inverter system as the embodiment according to the invention. The circuit is that in the case in which two inverters are connected in parallel to combine their output for driving a motor as a load.

In FIG. 1, reference numeral 1 denotes a three-phase AC motor and reference numerals 2a and 2b denote inverters. Here, reference numeral 2a is to denote a master inverter and reference numeral 2b is to denote a slave inverter. To the motor 1, a rotated position detector 3 such as a pulse encoder is connected so that the information of the rotated position (rotation angle and rotation speed) of the motor 1 can be obtained.

The inverters 2a and 2b are provided with electric power converters 4a and 4b, respectively, to each of which a DC voltage is inputted. The electric power converter 4a is formed of combinations of capacitors $C_{1a}$ and $C_{2a}$ and semiconductor switching devices such as IGBTs $Q_{1a}$ and $Q_{2a}$, $Q_{3a}$ and $Q_{4a}$, and $Q_{5a}$ and $Q_{6a}$, each of the combinations being connected in series between DC bus wires, and an unillustrated gate driving circuit. The electric power converter 4b is formed of combinations of capacitors $C_{1b}$ and $C_{2b}$ and semiconductor switching devices such as IGBTs $Q_{1b}$ and $Q_{2b}$, $Q_{3b}$ and $Q_{4b}$, and $Q_{5b}$ and $Q_{6b}$, each of the combinations being connected in series between DC bus wires, and an unillustrated gate driving circuit.

The switching devices $Q_{1a}$ to $Q_{6a}$ and $Q_{1b}$ to $Q_{6b}$ are driven by the control units 5a and 5b, respectively, each of which includes a processor such as a microcomputer (CPU) and various kinds of electronic circuits. The unillustrated gate driving circuits described before can be contained in the control units 5a and 5b, respectively.

The output voltages and the output currents of the inverters 2a and 2b are detected by voltage detectors 6a and 6b and current detectors 7a and 7b to be inputted to the control units 5a and 5b, respectively. Along with this, the information of the rotated position from the rotated position detector 3 is also inputted to the control units 5a and 5b. In the control units 5a and 5b, gate signals for the switching devices $Q_{1a}$ to $Q_{6a}$ and $Q_{1b}$ to $Q_{6b}$ are produced, respectively, on the basis of the inputted information. The AC currents, outputted from the electric power converters 4a and 4b by the on-off operations of the switching devices $Q_{1a}$ to $Q_{6a}$ and $Q_{1b}$ to $Q_{6b}$ and transmitted by cables through terminal blocks 8a and 8b, respectively, to the connection point to the motor 1, are combined at the connection point to be thereafter supplied to the motor 1.

In addition, to the control units 5a and 5b, operation readouts 10a and 10b are connected, respectively, as interfaces with an operator. The control units 5a and 5b mutually transmit items of internal information by using transmitting means 9a and 9b, respectively, to share the items of the information by storing the items of the information in their respective memories.

In the next, the operation of the parallel inverter system as the embodiment will be explained. First, the output currents of the inverters 2a and 2b, the number of the parallel arrangement of which is determined so as to be commensurate with the rated current and the operating conditions of the motor 1, are combined as was explained before to be supplied to the motor 1.

Then, in an operation under a normal condition, the control unit 5a in the master inverter 2a produces speed instruction values with which the motor 1 is started into motion from a standstill, then accelerated to reach a target speed and operated until being decelerated to be stopped depending on conditions. From the speed instruction values and actual rotation speed values detected by the rotated position detector 3, current instruction values corresponding to the generated torques of the motor 1 are calculated out so that the motor 1 follows the speed instruction values. Along with this, from the output current values detected by the current detector 7a and the current instruction values, voltage instruction values are calculated out.

On the basis of the voltage instruction values, gate signals for the switching devices $Q_{1a}$ to $Q_{6a}$ in the electric power converter 4a are produced. With the use of the gate signals, the switching devices $Q_{1a}$ to $Q_{6a}$ are made to be turned-on and -off, by which a PWM controlled voltage is outputted.

In the slave inverter 2b, voltage instruction values operated by the master inverter 2a are captured in the control units 5b through the transmitting means 9a and 9b, by which the electric power converter 4b operates similarly to the electric power converters 4a in the master inverter 2a. Moreover, an output current detected by the current detector 7b is also transmitted to the control unit 5a in the master inverter 2a through the transmitting means 9a and 9b.

Between the inverters 2a and 2b, a current referred to as a cross current or a circulating current can be caused to flow with a value according to the degree of a voltage error caused by coupling the outputs of the inverters 2a and 2b. Against this, cross current control is also carried out in some cases in which the control unit 5a in the master side and the control unit 5b in the slave side correct their respective voltage instruction values so that the respective output current values from the inverters 2a and 2b become equal.

Next, explanations will be made with respect to an improper wiring detecting operation as a principal part of the invention.

Figure 2:
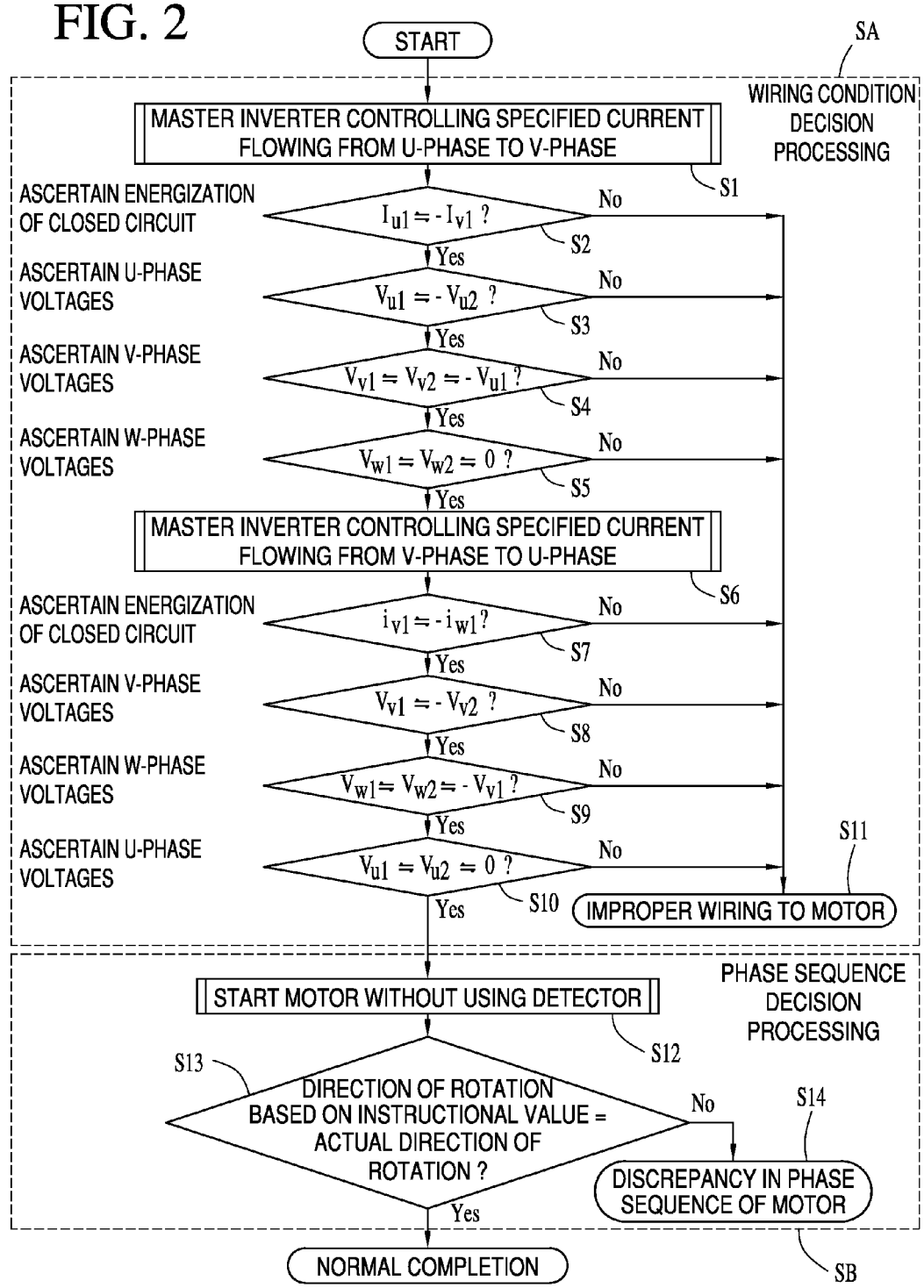
FIG. 2 is a flow chart showing an example of the whole of an improper wiring detecting operation in the embodiment according to the invention.

FIG. 2 is a flow chart showing an example of the whole of an improper wiring detecting operation in the embodiment. First, wiring condition decision processing SA is carried out with phase sequence decision processing SB carried out next. Although an error in a phase sequence (a discrepancy between the phase sequence on the output side of the inverters and the phase sequence on the input side of the motor) is due to a kind of improper wiring, the phase sequence decision processing SB here will be explained as being distinguished from the wiring condition decision processing SA for the sake of convenience.

In the wiring condition decision processing SA, in order that a current is made to flow from one phase (the U-phase, for example) in the master inverter 2a to another phase (the V-phase, for example), a closed circuit is formed between the two phases (step S1). Specifically, a specified current instruction value is prepared by the control unit 5a and current instruction values ($V_{ur}$ and $V_{vr}$) are then obtained so that the value of a current $I_{u1}$ detected by the current detector 7a follows the current instruction value to turn-on switching devices in the two phases (the U-phase and the V-phase, for example) in the electric power converter 4a. Here, in the electric power converter 4a, no switching devices in the rest phase (the W-phase, for example) are made to be turned-on. Then, the values of the output voltages $V_{u1}$, $V_{v1}$ and $V_{w1}$ in all of the phases are detected by the voltage detector 6a to be captured in the control unit 5a together with the value of the currents $I_{u1}$ and $I_{v1}$ detected by the current detector 7a.

In the slave inverter 2b, with no switching devices in all of the phases being turned-on by the electric power converter 4b, the values of the output voltages $V_{u2}$, $V_{v2}$ and $V_{w2}$ are detected to be captured in the control unit 5b. Along with this, the control unit 5b mutually shares information with the control unit 5a on the side of the master inverter 2a through the transmitting means 9a and 9b (the control units 5a and 5b store and keep the values of the output voltages $V_{u1}$, $V_{v1}$, $V_{w1}$, $V_{u2}$, $V_{v2}$ and $V_{w2}$ in their respective internal memories together).

Following this, the presence or absence of the disconnection between the U-phase and the V-phase in the master inverter 2a is ascertained. Here, the disconnection includes a failure such as an unfinished connection to the terminal block in addition to a so-called disconnection caused by breaking of wire.

The formation of a closed circuit without disconnection allows the current in the U-phase and the current in the V-phase to flow with the polarities thereof being opposite to each other. Therefore, it is ascertained whether the relation of $I_{u1} \approx -I_{v1}$ holds or not (S2). When the relation of $I_{u1} \approx -I_{v1}$ holds, the processing shifts to step S3. When the relation does not hold, the disconnection is regarded as a kind of improper wiring and the processing jumps to step S11.

When both of the master inverter 2a and the slave inverter 2b have no improper wiring, the impedance of the wiring can be sufficiently smaller than the impedance of the motor 1 that the output voltages in the respective corresponding phases are brought to be approximately equal to each other. Therefore, subsequent to step S2, the detected values of the voltages in the respective phases shared by both of the inverters 2a and 2b are compared to ascertain whether or not the values of the detected voltages become as $V_{u1} \approx V_{u2}$, $V_{v1} \approx V_{v2}$, and $V_{w1} \approx V_{w2}$, by which the presence or absence of improper wiring is decided (S3 to S5, and S11).

Moreover, when a closed circuit is formed between the U-phase and the V-phase, the relation of $V_{u1} = -V_{v1}$ holds, and the output voltage in an unenergized phase (the W-phase, for example) can be caused to become zero. This is also ascertained at the same time (S4, S5 and S11).

With this ascertainment, there is the possibility that the wiring of the unenergized phase (in the example, the W-phase) is not connected (e.g., unfinished connection to the terminal block or broken). Therefore, with the combination of the two phases, between which a closed circuit is formed by turning-on the switching devices, being changed (in the example shown in FIG. 2, from the combination of the U-phase and the V-phase to the combination of the V-phase and the W-phase), processing similar to that from step S1 to step S5 is carried out (S6 to S10, S11).

By the processing in the foregoing, the wiring condition decision processing SA is completed. When decision is made in the processing that there is improper wiring (S11), the operation readouts 10a and 10b display that there is improper wiring to give warning to operators.

Incidentally, execution of the wiring condition decision processing SA permits the ascertainment of the presence or absence of improper wiring in each of the phases in the master inverter 2a and the slave inverter 2b. The execution, however, cannot ascertain whether or not the three phase outputs of each of the inverters 2a and 2b are connected to the input side of the motor 1 with a correct phase sequence through cables.

Thus, by the phase sequence decision processing SB, a decision is made as to whether the phase sequence is correct or not from the direction of rotation when the motor 1 is rotated.

When the rotation of the motor 1 is controlled by making use of the rotation angle and the rotation speed obtained from the rotated position detector 3 shown in FIG. 1, an incorrect phase sequence might cause an excessive current to flow. Thus, at the beginning, the motor 1 is started without using a detector such as the rotated position detector 3 (S12). For specific driving control systems in this case, control systems such as a constant V/f (voltage/frequency) control system and a sensorless vector control system are possibilities, for example.

Next, a comparison is made between the direction of rotation based on the speed instruction value when driving the motor 1 and the actual direction of rotation of the motor 1 obtained from the rotated position detector 3 for making a decision as to whether both of the directions of rotation are the same or not (S13). Here, when the phase sequence is correct, the direction of rotation based on the speed instruction value is the same as the actual direction of rotation. Thus, the processing is brought to normal completion ("Yes" at S13). When the phase sequence is incorrect, the motor 1 rotates in the direction opposite to the direction of rotation based on the speed instruction value. Then, a decision is made that there is discrepancy in the phase sequences and the operation readouts 10a and 10b display that there is an error in the phase sequence to give warning to operators ("No" at S13, and S14).

Figure 3:
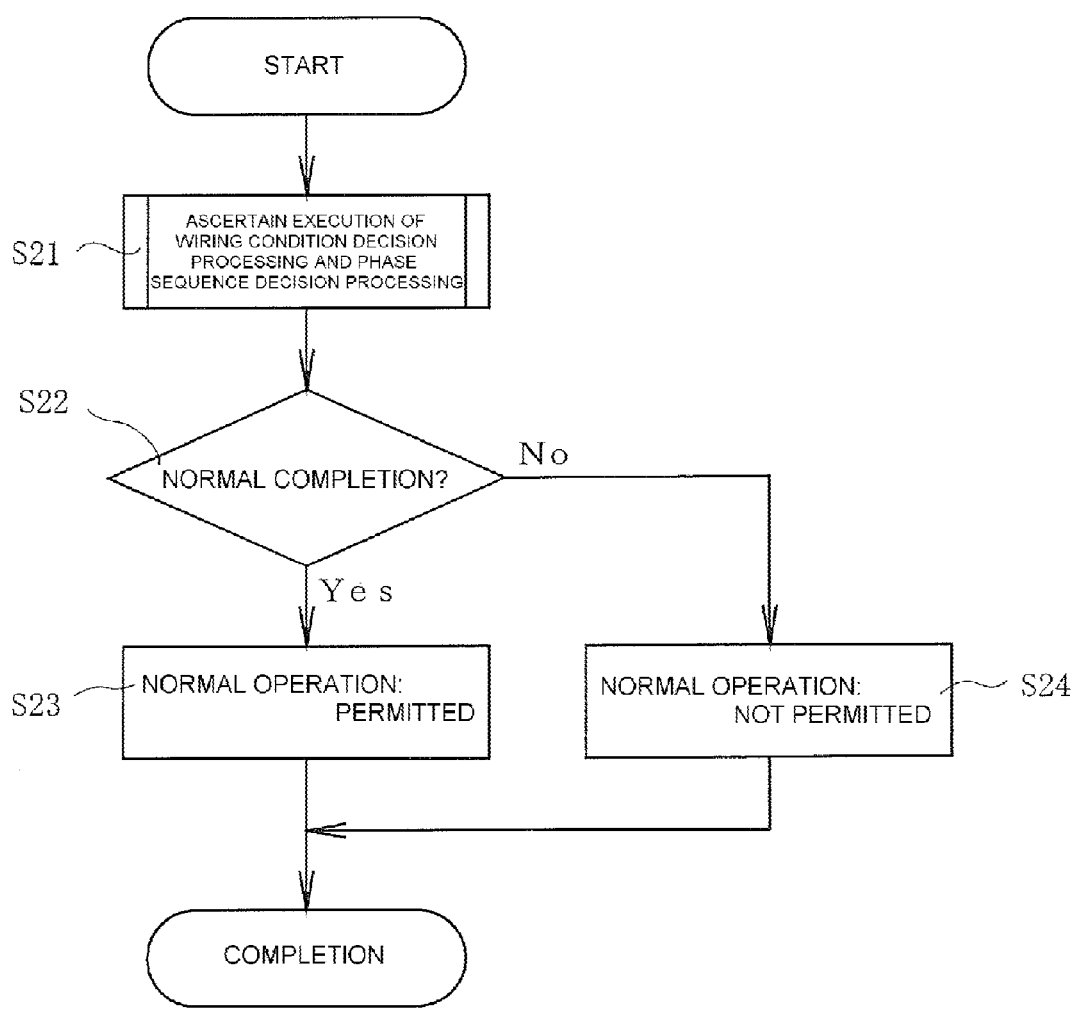
FIG. 3 is a flow chart showing another example of the improper wiring detecting operation in the embodiment according to the invention.
Figure 4:
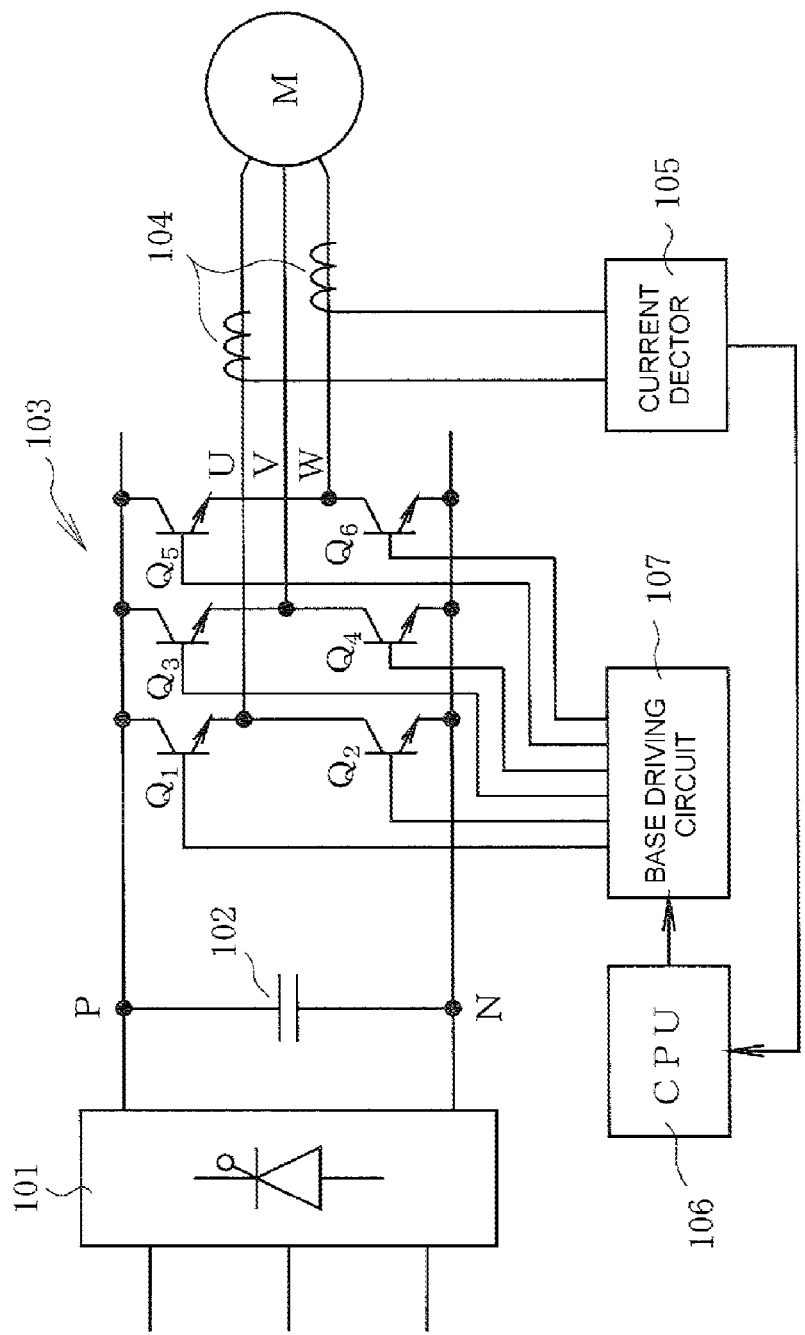
FIG. 4 is a circuit diagram showing an example of a motor driving system with an inverter in related art.
Figure 5:
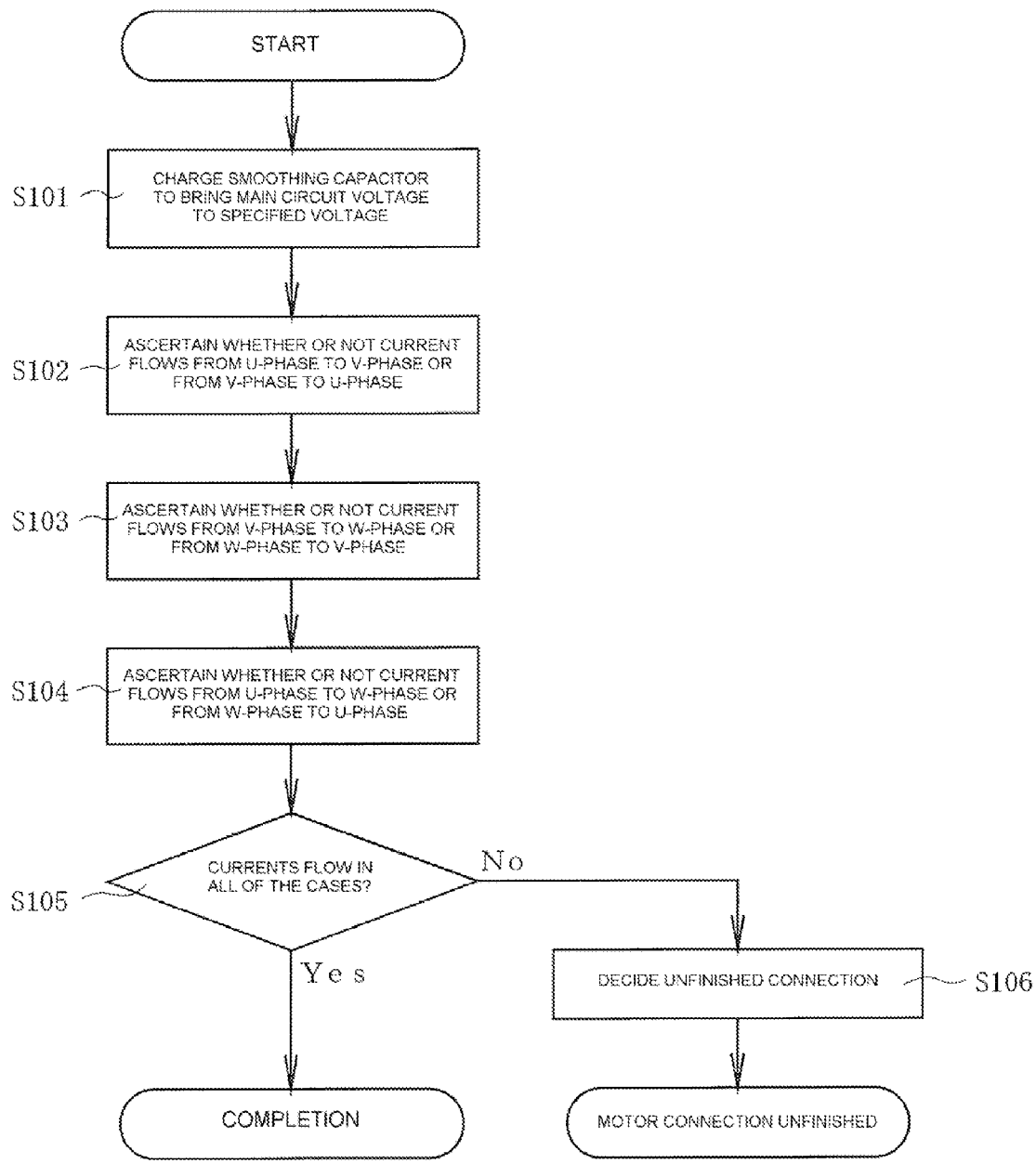
FIG. 5 is a flow chart showing the operation of detecting a state of an unfinished connection between the inverter and the motor in the motor driving system in the related art shown in FIG. 4.

FIG. 3 is a flow chart showing another example of the improper wiring detecting operation in the embodiment according to the invention.

In FIG. 3, first, the execution of the wiring condition decision processing SA and the phase sequence decision processing SB shown in FIG. 2 is ascertained (step S21). Next, a decision is made as to whether the items of the processing have been normally completed or not (S22). When the items of the processing have been normally completed, the processing permitting the normal operation explained in the foregoing (the operation of the motor 1 by the inverters 2a and 2b) is executed ("Yes" at S22, and S23). When the items of the processing have not been normally completed, the processing not permitting the normal operation is executed ("No" at S22, and S24).

The improper wiring detecting operation shown in FIG. 3 is based on the assumption that the execution of the wiring condition decision processing SA and the execution of the phase sequence decision processing SB have been completed when the parallel inverter system is operated. Thus, according to the operation shown in FIG. 3, a normal operation is to be permitted only when no wiring problem is found as a result of both of the decision processing SA and the decision processing SB. Therefore, troubles occurring after the inverter system is brought into practical operation can be prevented before the troubles occur.

While the present invention has been particularly shown and described with reference to the preferred embodiment thereof, it will be understood by those skilled in the art that the foregoing and other changes in form and details can be made therein without departing from the spirit and scope of the present invention.

What is claimed is:

1. A system, comprising:
   a first inverter configured to output polyphase electric power;
   a second inverter, coupled to the first inverter, and configured to output polyphase electric power; and
   an evaluation device configured to determine a condition of the system by comparing respective output voltages of the first inverter and the second inverter for each of corresponding phases and to decide based on the comparing whether wiring of the system is correct or not.

2. The system of claim 1, wherein the condition relates to a wiring fault.

3. The system of claim 2, wherein the evaluation device includes a control device configured to:
   control switches in the first inverter to cause a current to flow from one phase to another phase;
   capture voltages corresponding respectively to the one phase and the other phase; and
   compare the captured voltages with voltages of the second inverter corresponding respectively to the one phase and the other phase.

4. The system of claim 3, wherein the first inverter is a master device and the second inverter is a slave device.

5. An improper wiring detecting system of a parallel inverter system formed of a plurality of inverters connected in parallel, each outputting polyphase AC electric power of variable voltage, with output sides of the respective inverters connected to a single load, the improper wiring detecting system comprising:
   a voltage detecting means for detecting an output voltage of each of phases of each of the inverters;
   a controlling means for controlling turning-on and -off of semiconductor devices forming each of the inverters; and
   a wiring condition deciding means for operating the controlling means to turn-on specified switching devices in one inverter to form a closed circuit between arbitrary two phases of the one inverter, carrying out comparisons among values of output voltages of a plurality of the inverters including the one inverter, each of the output voltages being an output voltage of each of the phases of each inverter and being detected by the voltage detecting means, and making a decision as to whether wiring is correct or not on based on results of the comparisons.

6. The improper wiring detecting system of a parallel inverter system according to claim 5, wherein a means for mutually transmitting values of the output voltages detected by the voltage detecting means among a plurality of the inverters and sharing the values is provided in each of a plurality of the inverters.

7. The improper wiring detecting system of a parallel inverter system according to claim 6, further comprising a phase sequence deciding means for starting a polyphase AC motor as the load, connected to an inverter with wiring decided to be normal by the wiring condition deciding means, without use of information of a rotated position to make a comparison between a direction of rotation based on a speed instruction value of the motor and a direction of actual rotation for making a decision as to whether a phase sequence of the motor is correct or not.

8. The improper wiring detecting system of a parallel inverter system according to claim 7, wherein a plurality of the inverters are allowed to carry out normal operations only at completion of decision processing by at least one of the wiring condition deciding means or the phase sequence deciding means.

9. The improper wiring detecting system of a parallel inverter system according to claim 8, wherein at least one of the wiring condition deciding means or the phase sequence deciding means is actualized by a processing unit in the controlling means.

10. The improper wiring detecting system of a parallel inverter system according to claim 7, wherein at least one of the wiring condition deciding means or the phase sequence deciding means is actualized by a processing unit in the controlling means.

11. The improper wiring detecting system of a parallel inverter system according to claim 6, wherein a plurality of the inverters are allowed to carry out normal operations only at completion of decision processing by at least one of the wiring condition deciding means or a phase sequence deciding means.

12. The improper wiring detecting system of a parallel inverter system according to claim 11, wherein at least one of the wiring condition deciding means or the phase sequence deciding means is actualized by a processing unit in the controlling means.

13. The improper wiring detecting system of a parallel inverter system according to claim 6, wherein at least one of the wiring condition deciding means or a phase sequence deciding means is actualized by a processing unit in the controlling means.

14. The improper wiring detecting system of a parallel inverter system according to claim 5, further comprising a phase sequence deciding means for starting a polyphase AC motor as the load, connected to an inverter with wiring decided to be normal by the wiring condition deciding means, without use of information of a rotated position to make a comparison between a direction of rotation based on a speed instruction value of the motor and a direction of actual rotation for making a decision as to whether a phase sequence of the motor is correct or not.

15. The improper wiring detecting system of a parallel inverter system according to claim 14, wherein a plurality of the inverters are allowed to carry out normal operations only at completion of decision processing by at least one of the wiring condition deciding means or the phase sequence deciding means.

16. The improper wiring detecting system of a parallel inverter system according to claim 15, wherein at least one of the wiring condition deciding means or the phase sequence deciding means is actualized by a processing unit in the controlling means.

17. The improper wiring detecting system of a parallel inverter system according to claim 14, wherein at least one of the wiring condition deciding means or the phase sequence deciding means is actualized by a processing unit in the controlling means.

18. The improper wiring detecting system of a parallel inverter system according to claim 5, wherein a plurality of the inverters are allowed to carry out normal operations only at completion of decision processing by at least one of the wiring condition deciding means or a phase sequence deciding means.

19. The improper wiring detecting system of a parallel inverter system according to claim 18, wherein at least one of the wiring condition deciding means or the phase sequence deciding means is actualized by a processing unit in the controlling means.

20. The improper wiring detecting system of a parallel inverter system according to claim 5, wherein at least one of the wiring condition deciding means or a phase sequence deciding means is actualized by a processing unit in the controlling means.

* * * * *